US012771583B2

(12) United States Patent
Zhang et al.

(10) Patent No.: US 12,771,583 B2
(45) Date of Patent: Oct. 20, 2026

(54) DATA TRANSMISSION METHOD AND APPARATUS

(71) Applicant: DATANG MOBILE COMMUNICATIONS EQUIPMENT CO., LTD., Beijing (CN)

(72) Inventors: Yujie Zhang, Beijing (CN); Wei Bai, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 248 days.

(21) Appl. No.: 18/726,117

(22) PCT Filed: Dec. 22, 2022

(86) PCT No.: PCT/CN2022/141144
§ 371 (c)(1),
(2) Date: Jul. 2, 2024

(87) PCT Pub. No.: WO2023/130979
PCT Pub. Date: Jul. 13, 2023

(65) Prior Publication Data

US 2025/0119327 A1 Apr. 10, 2025

(30) Foreign Application Priority Data

Jan. 7, 2022 (CN) ......................... 202210014545.2

(51) Int. Cl.
*H04L 27/00* (2006.01)
*H04W 72/0446* (2023.01)

(52) U.S. Cl.
CPC ..... *H04L 27/0008* (2013.01); *H04W 72/0446* (2013.01)

(58) Field of Classification Search
CPC . H04L 27/0008; H04L 1/0003; H04L 1/0016; H04W 72/0446
See application file for complete search history.

(56) References Cited

U.S. PATENT DOCUMENTS 11,464,019 B2 10/2022 Peng
2010/0232348 A1 9/2010 Wu et al.
(Continued)

FOREIGN PATENT DOCUMENTS

CN 102227896 A 10/2011
CN 107733553 A 2/2018
(Continued)

OTHER PUBLICATIONS

Notice of Allowance in Chinese patent application No. 202210014545.2, issued on Apr. 8, 2026.
(Continued)

*Primary Examiner* — Mohammad S Anwar
(74) *Attorney, Agent, or Firm* — Ladas & Parry, LLP

(57) ABSTRACT

Disclosed are a data transmission method and apparatus. The method includes: determining, based on characteristic information of an available time domain resource of a terminal device or indication information from a network device, a modulation scheme corresponding to the available time domain resource, the characteristic information of the available time domain resource including a location of the available time domain resource and/or a length of the available time domain resource; and transmitting to-be-transmitted data of the terminal device based on the modulation scheme.

20 Claims, 6 Drawing Sheets

(56) References Cited

U.S. PATENT DOCUMENTS

| | | | | |
|---|---|---|---|---|
| 2016/0323855 | A1 | 11/2016 | Nakamura et al. | |
| 2019/0109676 | A1 | 4/2019 | Zhang et al. | |
| 2020/0213033 | A1 | 7/2020 | Chen | |
| 2020/0314817 | A1* | 10/2020 | Sun ........................ | H04W 72/23 |
| 2021/0007107 | A1 | 1/2021 | Peng | |
| 2021/0226725 | A1 | 7/2021 | Chen | |

FOREIGN PATENT DOCUMENTS

| | | | |
|---|---|---|---|
| CN | 109150403 | A | 1/2019 |
| CN | 110167173 | A | 8/2019 |
| CN | 111034144 | A | 4/2020 |
| CN | 111314025 | A | 6/2020 |
| EP | 2222009 | A1 | 8/2010 |
| EP | 3694168 | A1 | 8/2020 |
| KR | 10-2010-0081758 | A | 7/2010 |
| WO | 2011035472 | A1 | 3/2011 |
| WO | 2021244386 | A1 | 12/2021 |

OTHER PUBLICATIONS

Second Office Action in Chinese patent application No. 202210014545.2, issued on Jan. 20, 2026.

International Search Report of International Patent Application No. PCT/CN2022/141144 mailed on Mar. 7, 2023, with the English translation provided by WIPO.

Written Opinion of the International Searching Authority of International Patent Application No. PCT/CN2022/141144 mailed on Mar. 7, 2023, with machine translation provided by WIPO.

3GPP TSG-RAN WG5 5GR-NR Adhoc Meeting #2, Taoyaun, Taiwan, Apr. 9-13, 2018, R5-181942, "Addition of new NR MAC test case 7.1.4.1.1".

Office Action in Chinese patent Application No. 202210014545.2, issued on Jul. 28, 2025, with English translation provided by Google Translate.

Extended European Search Report from EP patent application No. 22918422.1 mailed Mar. 17, 2025.

* cited by examiner

DATA TRANSMISSION METHOD AND APPARATUS

CROSS-REFERENCE TO RELATED APPLICATIONS

This application is a U.S. national stage application of PCT International Application No. PCT/CN2022/141144 filed on Dec. 22, 2022, which claims a priority to Chinese Patent Application No. 202210014545.2, filed at the Chinese Patent Office on Jan. 7, 2022 and entitled "DATA TRANSMISSION METHOD AND APPARATUS", the contents of which are incorporated herein by reference in their entireties.

TECHNICAL FIELD

The present application relates to the field of communication technologies, and particularly to a data transmission method and apparatus.

BACKGROUND

At present, with continuous development and change of mobile communication, a new wireless communications system, i.e., 6G, has gradually become a focus of research.

In existing access technologies, terminals typically determine a corresponding modulation scheme based on a network-indicated manner or a preset manner. Specifically, when a preset modulation scheme is used in communication, if the preset modulation scheme is a relatively high-order modulation scheme, and the terminal has sufficient available resources and a relatively small amount of data to be transmitted, it may result in a waste of resources, for example, a zero padding is required.

Also, if the preset modulation scheme is a relatively low-order modulation scheme, and the terminal has limited available resources and a relatively large amount of data to be transmitted, it is impossible to transmit all the data in a single transmission. For example, operations such as segmentation and multiple transmissions are required, which increases the delay of data transmission.

In addition, the growth in the number of connected devices is one of the key driving forces of 6G, and in terms of specific key technical indicators, the density of the connected devices may reach up to tens of millions of terminals per square kilometer. Therefore, considering the number of connected devices, it is impossible to use orthogonal multiple access technologies such as Orthogonal Frequency Division Multiple Access (OFDMA) that require pre-coordination to determine the modulation scheme.

It can be seen that in the related art, there is an urgent need for a solution that adaptively selects the modulation scheme to efficiently utilize the resources.

SUMMARY

Specific technical solutions provided by embodiments of the present application are as follows.

According to a first aspect, an embodiment of the present application provides a data transmission method, applied to a terminal device, and the method includes:

- determining, based on characteristic information of an available time domain resource of the terminal device or indication information from a network device, a modulation scheme corresponding to the available time domain resource, the characteristic information of the available time domain resource including a location of the available time domain resource and/or a length of the available time domain resource; and
- transmitting to-be-transmitted data of the terminal device based on the modulation scheme.

In a possible implementation, when the characteristic information of the available time domain resource is the length of the available time domain resource, determining, based on the characteristic information of the available time domain resource, the modulation scheme corresponding to the available time domain resource includes:

- determining a target first mapping pattern between time domain resource lengths and modulation schemes; and
- determining the modulation scheme corresponding to the available time domain resource based on the length of the available time domain resource and the target first mapping pattern.

In a possible implementation, the target first mapping pattern includes: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

In a possible implementation, different groups of time domain resource lengths correspond to different modulation schemes, or some or all of the groups of time domain resource lengths correspond to a same modulation scheme.

In a possible implementation, determining the target first mapping pattern between time domain resource lengths and modulation schemes includes: determining the target first mapping pattern from multiple first mapping patterns based on an identifier of the terminal device or the indication information from the network device.

In a possible implementation, when the characteristic information of the available time domain resource is the location of the available time domain resource, the determining, based on the characteristic information of the available time domain resource, the modulation scheme corresponding to the available time domain resource includes:

- determining a target second mapping pattern between time domain resource sets and modulation schemes, the target second mapping pattern being determined from multiple second mapping patterns based on an identifier of the terminal device or the indication information from the network device; and
- determining the modulation scheme corresponding to the available time domain resource based on the target second mapping pattern and the location of the available time domain resource.

In a possible implementation, a location relationship between different time domain resource sets includes any one of adjacent, spaced, or partially overlapping.

In a possible implementation, the time domain resource set is any one of multiple time domain resource sets obtained by dividing an initial time domain resource set based on location.

In a possible implementation, determining the modulation scheme corresponding to the available time domain resource based on the target second mapping pattern and the location of the available time domain resource includes:

- when the location of the available time domain resource overlaps any time domain resource set in the target second mapping pattern, determining the modulation scheme corresponding to the time domain resource set overlapping the available time domain resource as the modulation scheme corresponding to the available time domain resource; or when the location of the available time domain resource corresponds to multiple time domain resource sets in the target second mapping pattern, using any one or more of modulation schemes corresponding to the multiple time domain resource sets as the modulation scheme corresponding to the available time domain resource; or when the location of the available time domain resource is a subset of any time domain resource set in the target second mapping pattern, using the modulation scheme corresponding to the time domain resource set to which the available time domain resource belongs as the modulation scheme corresponding to the available time domain resource; or when the location of the available time domain resource intersects with any time domain resource set in the target second mapping pattern but does not intersect with other time domain resource sets other than the intersected time domain resource set, using the modulation scheme corresponding to the intersected time domain resource set as the modulation scheme corresponding to the available time domain resource; or when the location of the available time domain resource includes multiple partial time domain resource sets in the target second mapping pattern, using any one of modulation schemes corresponding to the multiple time domain resource sets as the modulation scheme corresponding to the available time domain resource.

According to a second aspect, a data transmission method applied to a network device is provided, including:

determining a modulation scheme for received data based on characteristic information of an available time domain resource of the received data or indication information from the network device, the characteristic information of the available time domain resource including a location of the available time domain resource and/or a length of the available time domain resource; and processing the received data based on the modulation scheme for the received data.

In a possible implementation, determining the modulation scheme for the received data based on the characteristic information of the available time domain resource of the received data or the indication information from the network device includes:

determining a target first mapping pattern between time domain resource lengths and modulation schemes; and determining the modulation scheme for the received data based on the length of the available time domain resource or the indication information from the network device, in combination with the target first mapping pattern.

In a possible implementation, the target first mapping pattern includes: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

In a possible implementation, different groups of time domain resource lengths correspond to different modulation schemes, or some or all of the groups of time domain resource lengths correspond to the same modulation scheme.

In a possible implementation, determining the modulation scheme for the received data based on the characteristic information of the available time domain resource of the received data or the indication information from the network device includes:

determining a target second mapping pattern between time domain resource sets and modulation schemes, the target second mapping pattern being determined from multiple second mapping patterns based on an identifier of a terminal device or the indication information from the network device; and determining the modulation scheme corresponding to the available time domain resource based on the target second mapping pattern and the location of the available time domain resource.

In a possible implementation, a location relationship corresponding to different time domain resource sets includes any one of adjacent, spaced, or partially overlapping.

In a possible implementation, the time domain resource set is any one of multiple different time domain resource sets obtained by dividing an initial time domain resource set based on location.

According to a third aspect, a data transmission apparatus is provided, including a memory, a transceiver, and a processor. The memory is configured to store a computer program, the transceiver is configured to receive and transmit data under control of the processor, the processor is configured to read the computer program in the memory and perform the following operations:

determining, based on characteristic information of an available time domain resource of a terminal device or indication information from a network device, a modulation scheme corresponding to the available time domain resource, the characteristic information of the available time domain resource including a location of the available time domain resource and/or a length of the available time domain resource; and transmitting to-be-transmitted data of the terminal device based on the modulation scheme.

In a possible implementation, when the characteristic information of the available time domain resource is the length of the available time domain resource, the processor performs the following operations:

determining a target first mapping pattern between time domain resource lengths and modulation schemes; and determining the modulation scheme corresponding to the available time domain resource based on the length of the available time domain resource and the target first mapping pattern.

In a possible implementation, the target first mapping pattern includes: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

In a possible implementation, different groups of time domain resource lengths correspond to different modulation schemes, or some or all of the groups of time domain resource lengths correspond to a same modulation scheme.

In a possible implementation, the processor performs the following operations: determining the target first mapping pattern from multiple first mapping patterns based on an identifier of the terminal device or the indication information from the network device.

In a possible implementation, when the characteristic information of the available time domain resource is the location of the available time domain resource, the processor performs the following operations:

determining a target second mapping pattern between time domain resource sets and modulation schemes, the target second mapping pattern being determined from multiple second mapping patterns based on an identifier of the terminal device or the indication information from the network device; and determining the modulation scheme corresponding to the available time domain resource based on the target second mapping pattern and the location of the available time domain resource.

In a possible implementation, a location relationship between different time domain resource sets includes any one of adjacent, spaced, or partially overlapping.

In a possible implementation, the time domain resource set is any one of multiple time domain resource sets obtained by dividing an initial time domain resource set based on location.

In a possible implementation, the processor performs the following operations:

when the location of the available time domain resource overlaps any time domain resource set in the target second mapping pattern, determining the modulation scheme corresponding to the time domain resource set overlapping the available time domain resource as the modulation scheme corresponding to the available time domain resource; or when the location of the available time domain resource corresponds to multiple time domain resource sets in the target second mapping pattern, using any one or more of modulation schemes corresponding to the multiple time domain resource sets as the modulation scheme corresponding to the available time domain resource; or when the location of the available time domain resource is a subset of any time domain resource set in the target second mapping pattern, using the modulation scheme corresponding to the time domain resource set to which the available time domain resource belongs as the modulation scheme corresponding to the available time domain resource; or when the location of the available time domain resource intersects with any time domain resource set in the target second mapping pattern but does not intersect with other time domain resource sets other than the intersected time domain resource set, using the modulation scheme corresponding to the intersected time domain resource set as the modulation scheme corresponding to the available time domain resource; or when the location of the available time domain resource includes multiple partial time domain resource sets in the target second mapping pattern, using any one of modulation schemes corresponding to the multiple time domain resource sets as the modulation scheme corresponding to the available time domain resource.

According to a fourth aspect, a data transmission apparatus is provided, including a memory, a transceiver, and a processor. The memory is configured to store a computer program, The transceiver is configured to receive and transmit data under control of the processor, and the processor is configured to read the computer program in the memory and perform the following operations:

determining a modulation scheme for received data based on characteristic information of an available time domain resource of the received data or indication information from the network device, the characteristic information of the available time domain resource including a location of the available time domain resource and/or a length of the available time domain resource; and processing the received data based on the modulation scheme for the received data.

In a possible implementation, the processor performs the following operations:

determining a target first mapping pattern between time domain resource lengths and modulation schemes; and determining the modulation scheme for the received data based on the length of the available time domain resource or the indication information from the network device, in combination with the target first mapping pattern.

In a possible implementation, the target first mapping pattern includes: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

In a possible implementation, different groups of time domain resource lengths correspond to different modulation schemes, or some or all of the groups of time domain resource lengths correspond to the same modulation scheme.

In a possible implementation, the processor performs the following operations:

determining a target second mapping pattern between time domain resource sets and modulation schemes, the target second mapping pattern being determined from multiple second mapping patterns based on an identifier of a terminal device or the indication information from the network device; and determining the modulation scheme corresponding to the available time domain resource based on the target second mapping pattern and the location of the available time domain resource.

In a possible implementation, a location relationship between different time domain resource sets includes any one of adjacent, spaced, or partially overlapping.

In a possible implementation, the time domain resource set is any one of multiple different time domain resource sets obtained by dividing an initial time domain resource set based on location.

According to a fifth aspect, a data transmission apparatus is provided. The apparatus includes:

a determining unit configured to determine, based on characteristic information of an available time domain resource of a terminal device or indication information from a network device, a modulation scheme corresponding to the available time domain resource, the characteristic information of the available time domain resource including a location of the available time domain resource and/or a length of the available time domain resource; and a processing unit configured to transmit to-be-transmitted data of the terminal device based on the modulation scheme.

According to a sixth aspect, a data transmission apparatus is provided. The apparatus includes:

a determining unit configured to determine a modulation scheme for received data based on characteristic information of an available time domain resource of the received data or indication information from a network device, the characteristic information of the available time domain resource including a location of the available time domain resource and/or a length of the available time domain resource; and a processing unit configured to process the received data based on the modulation scheme for the received data.

According to a seventh aspect, an embodiment of the present application provides a non-transitory processor-readable storage medium. The non-transitory processor-readable storage medium stores a computer program, which is configured to cause the processor to perform any one of the methods as described in the first aspect.

According to an eighth aspect, an embodiment of the present application provides a non-transitory processor-readable storage medium. The non-transitory processor-readable storage medium stores a computer program, which is configured to cause the processor to perform any one of the methods as described in the second aspect.

BRIEF DESCRIPTION OF THE DRAWINGS

The accompanying drawings, which are incorporated in and constitute a part of this specification, illustrate embodiments consistent with the present application and are used together with the specification to explain the principles of the present application, and do not constitute an improper limitation of the present application.

DETAILED DESCRIPTION

Figure 1:
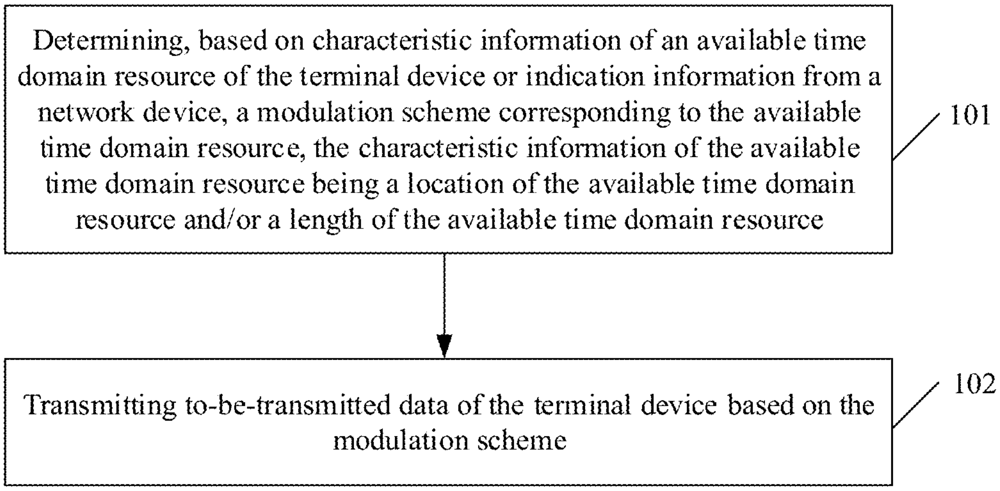
FIG. 1 is a schematic flowchart of a data transmission method according to an embodiment of the present application.

In embodiments of the present application, the term "and/or" describes a relationship between associated objects, and indicates that there may be three relationships. For example, A and/or B may represent the following three cases: only A exists, both A and B exist, and only B exist. The character "/" generally indicates that the associated objects are in an "or" relationship.

In the embodiments of the present application, the term "multiple" means two or more, and other quantifiers are intended to have a similar meaning.

In order to better understand the solutions provided by the present invention, some processes and terms involved in the solutions are explained below.

1. Terminal Device

The terminal device involved in the embodiments of the present application may be a device that provides voice and/or data connectivity to a user, a handheld device with a wireless connection function, or other processing devices connected to a wireless modem, etc. In different systems, the terminal device may have different names. For example, in a 5G system, the terminal device may be referred to as User Equipment (UE). A wireless terminal device can communicate with one or more Core Networks (CN) via a Radio Access Network (RAN). The wireless terminal device may be a mobile terminal device such as a mobile phone (or referred to as a "cellular" phone), or a computer with a mobile terminal device, including, for example, a portable mobile device, pocket-sized mobile device, handheld mobile device, computer built-in mobile device, or vehicle-mounted mobile device that exchanges voice and/or data with the radio access network. For example, the wireless terminal device may be a Personal Communication Service (PCS) phone, a cordless phone, a Session Initiated Protocol (SIP) phone, a Wireless Local Loop (WLL) station, or a Personal Digital Assistant (PDA), etc. The wireless terminal device may also be referred to as a system, a subscriber unit, a subscriber station, a mobile station, a mobile, a remote station, an access point, a remote terminal, an access terminal, a user terminal, a user agent, and a user device, and is not limited in the embodiments of the present application.

2. Network Device

The network device involved in the embodiments of the present application may be a base station, which may include a plurality of cells that provide service for terminals. Depending on different specific application scenarios, the base station may also be referred to as an access point, or may refer to a device in an access network communicating with the wireless terminal device via one or more sectors on an air interface, or other names. The network device may be configured to perform inter-conversion between a received air frame and an Internet Protocol (IP) packet, and used as a router between the wireless terminal device and the rest of the access network. The rest of the access network may include an Internet Protocol (IP) communication network. The network device may further coordinate the attribute management of the air interface. For example, the network device involved in the embodiments of the present application may be a network device (Base Transceiver Station (BTS)) in the Global System for Mobile communications (GSM) or Code Division Multiple Access (CDMA), a network device (NodeB) in the Wideband Code Division Multiple Access (WCDMA), an evolutional Node B (eNB or e-NodeB) in the Long Term Evolution (LTE) system, a 5G base station (gNB) in the 5G network architecture (next generation system), a Home evolved Node B (HeNB), a relay node, a home base station (femto), or a pico base station (pico), etc., and is not limited in the embodiments of the present application. In some network structures, the network device may include a centralized unit (CU) node and a distributed unit (DU) node, and the centralized unit and the distributed unit may also be geographically separated.

3. A current solution for determining a modulation scheme in the fifth-generation new radio system (5 Generation New RAT, 5G NR) is as follows: in the NR, a terminal device determines the modulation scheme by means of network scheduling. Typically, a terminal may determine information such as the modulation scheme by using a Modulation and Coding Scheme (MCS) index. For example, three MCS index tables are provided in the protocol 38.214.

It can be seen that in existing access technologies, the modulation scheme of the terminal device is based on a network indication or is preset. Specifically, when a preset modulation scheme is used in communication, if a relatively high-order modulation scheme is preset and the terminal device has sufficient available resources and a relatively small amount of data to be transmitted, it may result in a waste of resources. If a relatively low-order modulation scheme is preset and the terminal device has limited available resources and a relatively large amount of data to be transmitted, it is impossible to transmit all the data in a single transmission, for example, segmentation and multiple transmissions are required, which increases the delay of data transmission.

In view of this, the present application provides a data transmission method and apparatus. By this method, when a terminal device has sufficient available resources and a relatively small amount of data to be transmitted, a relatively low-order modulation scheme can be adaptively selected, thereby enabling more efficient use of resources and enhancing data transmission performance. In addition, when the terminal device has limited available resources and a relatively large amount of data to be transmitted, a relatively high-order modulation scheme can be adaptively selected, thereby reducing the delay of data transmission while ensuring data transmission performance. For example, all data can be transmitted in a single transmission.

It can be seen that based on the data transmission method provided in the embodiments of the present application, in random access scenarios, when a large number of terminal devices are accessing, the terminal devices can adaptively select the appropriate modulation scheme.

Specifically, the modulation scheme may be mapped based on a length of a time domain resource and/or a location of a time domain resource. When the modulation scheme is mapped based on the location of the time domain resource, more specifically, different time domain resource division patterns may be used to divide a first time unit into multiple time domain resource subsets. Lengths of the time domain resource subsets may be the same or different. Different time domain resource subsets may be adjacent, spaced, or overlapping. The terminal device determines a corresponding modulation scheme based on a location of the actually used time domain resource in the first time unit (or a mapping relationship between the used time domain resource and the time domain resource subset).

It should be noted that the solutions provided in the present application may be applied to single-step access scenarios, but is not limited to these scenarios, and may also be applied to other scenarios.

In the embodiments of the present application, FIG. 1 shows a data transmission method according to an embodiment of the present application. The method is applied to a terminal device, and a specific processing process is as follows.

In step 101, based on characteristic information of an available time domain resource of the terminal device or indication information from a network device, a modulation scheme corresponding to the available time domain resource is determined. The characteristic information of the available time domain resource includes a location of the available time domain resource and/or a length of the available time domain resource.

In a possible implementation, the terminal device can determine the characteristic information of the available time domain resource thereof. The characteristic information of the available time domain resource includes the location of the available time domain resource and/or the length of the available time domain resource.

Exemplarily, during a single-step access, the terminal device may determine the used time domain resource based on a preset rule or a network scheduling. The preset rule may be configured to map the time domain resource based on the unique identifier (Identity Document, ID) or other information of the terminal device.

In the embodiments of the present application, after determining the characteristic information of the available time domain resource, the terminal device can determine the modulation scheme corresponding to the available time domain resource based on the characteristic information of the available time domain resource of the terminal device.

Obviously, by the method of the terminal device determining the modulation scheme corresponding to the available time domain resource based on the characteristic information of the available time domain resource of the terminal device, the modulation scheme that meets the requirement for actual implementation of the terminal device can be determined. Therefore, using the modulation scheme to transmit data can make efficient use of resources and enhance data transmission performance.

In a possible implementation, the terminal device may also receive the indication information from the network device. The indication information from the network device is configured to indicate which modulation scheme is selected. Specifically, the indication information from the network device may be determined by the network device based on actual implementations, and is not limited in the embodiments of the present application.

In the embodiments of the present application, after determining the indication information from the network device, the terminal device can determine the modulation scheme corresponding to the available time domain resource based on the indication information from the network device.

It can be seen that the embodiments of the present application also provide another method for determining the modulation scheme corresponding to the available time domain resource, thereby enhancing the implementability of the solution. In addition, since the network device determines the corresponding indication information based on actual implementations, the determined modulation scheme is relatively consistent with actual implementation scenarios, so that resources can be better used to implement data transmission.

In the embodiments of the present application, for ease of understanding by those skilled in the art, several possible manners are listed below to illustrate the technical solution for determining the modulation scheme. It should be understood that the following examples are merely illustrative and do not intend to limit the embodiments of the present application. In addition to the following listed manners, other manners may also be used in specific implementation processes, which are not exhaustively listed herein.

Embodiment 1

In the embodiments of the present application, when the characteristic information of the available time domain resource is the length of the available time domain resource, the terminal device can determine the corresponding modulation scheme based on the length of the available time domain resource.

In the embodiments of the present application, before introducing how the terminal device determines the corresponding modulation scheme based on the length of the available time domain resource, a process of determining the length of the time domain resource and the modulation scheme is first introduced.

Exemplarily, time domain resource lengths may be grouped according to thresholds, and the time domain resource lengths in different groups correspond to different modulation schemes.

Figure 2:
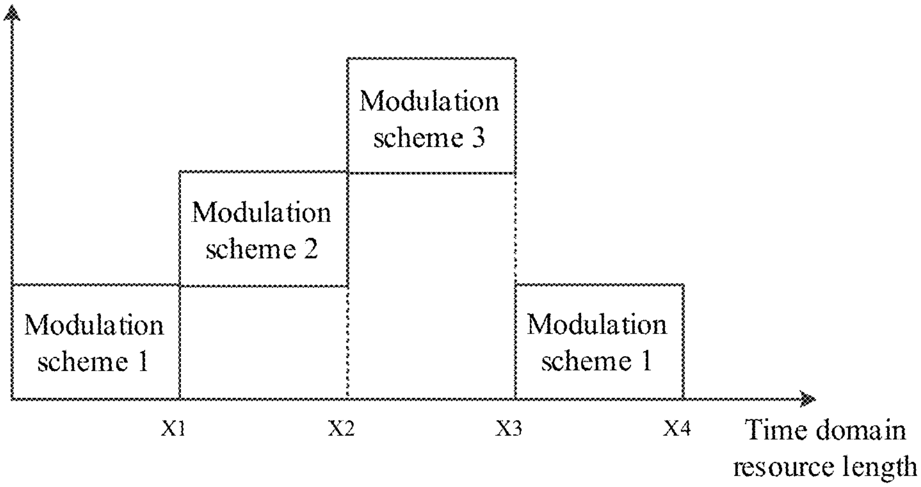
FIG. 2 is a schematic diagram illustrating a mapping between different time domain resource lengths and modulation schemes according to an embodiment of the present application.

For example, referring to FIG. 2, Xk represents the k-th threshold, and t represents the time domain resource length. The time domain resource lengths that meet $1 \leq t \leq X1$ (or $1 \leq t \leq X1$) are considered as a first group, the time domain resource lengths that meet $X1<t \leq X2$ (or $X1 \leq t<X2$) are considered as a second group, and so on. Referring to FIG. 2, the time domain resource lengths that meet $X2<t \leq X3$ (or $X2 \leq t<X3$) are considered as a third group, and the time domain resource lengths that meet $X3<t \leq X4$ (or $X3 \leq t \leq X4$) are considered as a fourth group. It should be noted that, in an actual implementation process, Xk may be determined based on t, or may be determined based on actual implementations, which is not limited in the embodiments of the present application.

Optionally, each group of time domain resource lengths corresponds to one modulation scheme. In other words, the mapping between the modulation schemes and the groups of time domain resource lengths may be one-to-one, i.e., each group of time domain resource lengths corresponds to a different modulation scheme. It can be understood that the mapping between the modulation schemes and the groups of time domain resource lengths may also be one-to-many, i.e., multiple groups of time domain resource lengths may correspond to the same modulation scheme.

It can be seen that different groups of time domain resource lengths correspond to different modulation schemes. Alternatively, some or all of the groups of time domain resource lengths correspond to the same modulation scheme.

For example, referring to FIG. 2, the first group and the fourth group may correspond to the same modulation scheme, i.e., modulation scheme 1. The first group, the second group, and the third group correspond to different modulation schemes, i.e., modulation scheme 1, modulation scheme 2, and modulation scheme 3, respectively.

Optionally, each time domain resource length may correspond to a different modulation scheme. Specifically, when the length of the actually used time domain resource is less than an integer multiple of a unit, for example, when the unit of the time domain resource length is defined based on a subframe level, it is possible to consider rounding up or down, and then the modulation scheme is mapped according to a rounded result.

For example, if an actual time domain resource length is greater than x1 subframes and less than x1+1 subframes, the modulation scheme may be mapped according to the time domain resource length of x1 subframes or x1+1 subframes.

In the embodiments of the present application, the unit of time domain resource may be a symbol, a timeslot, a subframe, a frame, a millisecond, a second, etc., and is not limited in the embodiments of the present application.

In the embodiments of the present application, the modulation scheme may be Binary Phase Shift Keying (BPSK), Quadrature Phase Shift Keying (QPSK), 16-Quadrature Amplitude Modulation (16QAM), 64QAM, 128QAM, 256QAM, On-off-keying (OOK), sub-carrier modulation scheme, etc., and is not limited in the embodiments of the present application.

In the embodiments of the present application, the mapping relationship between each group of time domain resource lengths and the modulation scheme and the mapping relationship between one time domain resource length and the modulation scheme may be referred to as a first mapping pattern. It can be seen that there may be multiple first mapping patterns, such that the time domain resources of the same length may map different modulation schemes.

In the embodiments of the present application, a target first mapping pattern is determined from the multiple first mapping patterns based on an identifier of the terminal device or the indication information from the network device.

For example, a time domain resource length L1 corresponds to a first modulation scheme, and a time domain resource length L2 corresponds to a second modulation scheme. A possible case is that $L1<L2$, i.e., when the length of an available time domain resource is relatively small, the first modulation scheme is selected, and when the length of the available time domain resource is relatively large, the lower-order second modulation scheme may be selected.

Embodiment 2

In the embodiments of the present application, when the characteristic information of the available time domain resource is the location of the available time domain resource, the terminal device can determine the corresponding modulation scheme based on the location of the available time domain resource.

In the embodiments of the present application, before introducing how the terminal device determines the corresponding modulation scheme based on the location of the available time domain resource, a process of determining time domain resource sets and the modulation schemes is first introduced.

In the embodiments of the present application, an initial resource set may be divided based on location to obtain multiple time domain resource sets. Each time domain resource set corresponds to a modulation scheme. Exemplarily, the initial resource set may be a timeslot, a subframe, a frame, a second, a millisecond, or other time units, and is not limited in the embodiments of the present application.

Exemplarily, lengths of the time domain resource sets may be the same or different. In addition, the time domain resource sets may be adjacent, spaced, or overlapping with each other. It can be seen that a location relationship between different time domain resource sets includes any one of adjacent, spaced, or partially overlapping.

Figure 3:
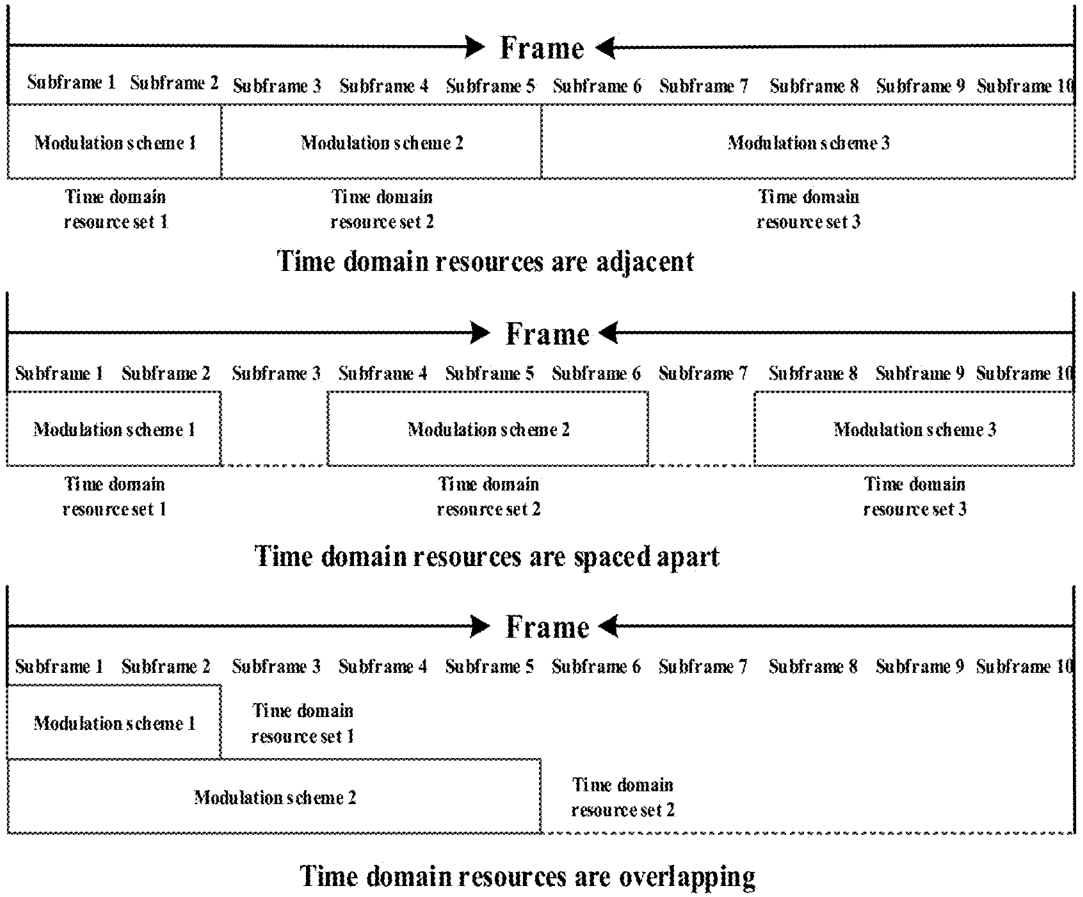
FIG. 3 is a schematic diagram illustrating a time domain resource set division pattern according to an embodiment of the present application.

For example, FIG. 3 is a schematic diagram illustrating a division of an initial resource set according to an embodiment of the present application. The division of the initial resource set will be illustrated by taking the frame as the unit of the time domain resource set as an example. FIG. 3 illustrates a schematic diagram of the division in which the time domain resources are adjacent, corresponding to the case that a time domain resource set 1, a time domain resource set 2, and a time domain resource set 3 are adjacent to each other, and the time domain resource set 1, the time domain resource set 2, and the time domain resource set 3 correspond to a modulation scheme 1, a modulation scheme 2, and a modulation scheme 3, respectively.

With continued reference to FIG. 3, FIG. 3 further illustrates a schematic diagram of the division in which the time domain resources are spaced, corresponding to the case that a time domain resource set 1 is spaced from a time domain resource set 2 by one subframe, the time domain resource set 2 is spaced from a time domain resource set 3 by one subframe, and the time domain resource set 1, the time domain resource set 2, and the time domain resource set 3 correspond to a modulation scheme 1, a modulation scheme 2, and a modulation scheme 3, respectively. Further, with continued reference to FIG. 3, FIG. 3 also illustrates a schematic diagram of the division in which the time domain resources are overlapped, corresponding to the case that a subframe 1 and a subframe 2 corresponding to a time domain resource set 1 are included in a time domain resource set 2, and the time domain resource set 1 and the time domain resource set 2 correspond to a modulation scheme 1 and a modulation scheme 2, respectively.

It should be noted that, in FIG. 3, only one situation occurs in one division, such as the situation in which the time domain resource sets are adjacent as shown in FIG. 3, the situation in which the time domain resource sets are spaced apart as shown in FIG. 3, and the situation in which the time domain resource sets are partially overlapped as shown in FIG. 3. In actual implementations, multiple combinations of the above three situations may occur, and the situations are not limited in the embodiments of the present application.

In the embodiments of the present application, the mapping relationship between each of the time domain resource sets and the modulation scheme may be referred to as a second mapping pattern. It can be seen that there may be multiple second mapping patterns, such that the same time domain resource set may map different modulation schemes.

In the embodiments of the present application, the terminal device can determine a target second mapping pattern between the time domain resource sets and the modulation schemes. The target second mapping pattern is determined from the multiple second mapping patterns based on an identifier of the terminal device or the indication information from the network device. Then, the modulation scheme corresponding to the available time domain resource is determined based on the target second mapping pattern and the location of the available time domain resource.

In a possible implementation, when the location of the available time domain resource overlaps any time domain resource set in the target second mapping pattern, the modulation scheme corresponding to the time domain resource set overlapping the available time domain resource is determined as the modulation scheme corresponding to the available time domain resource.

Figure 4:
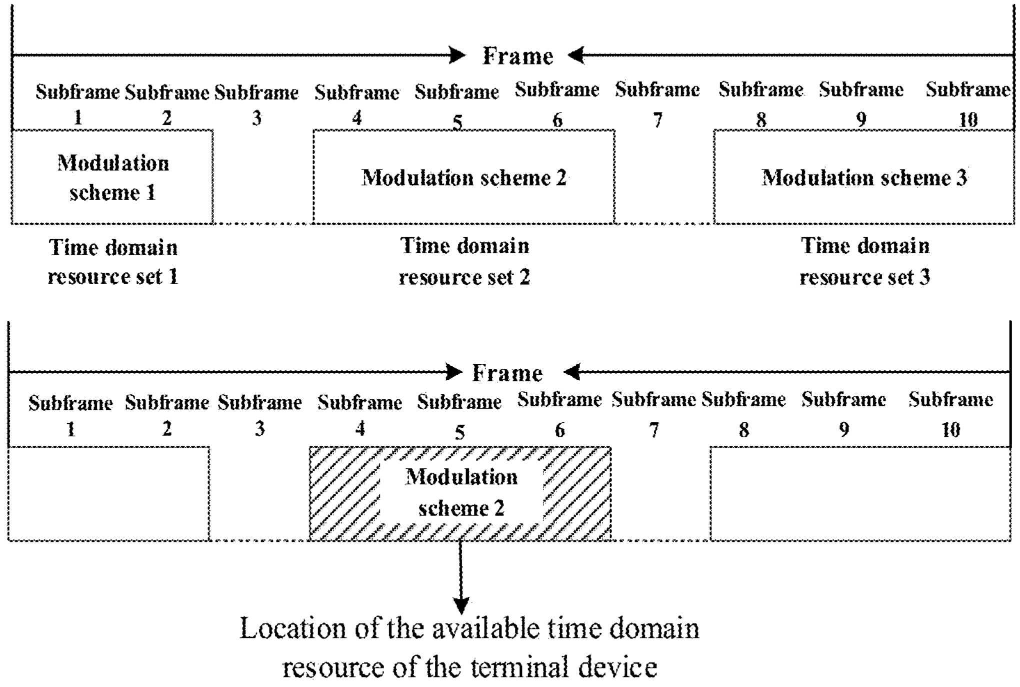
FIG. 4 is a schematic diagram of determining a modulation scheme according to an embodiment of the present application.

For example, referring to FIG. 4, which is a schematic diagram of determining a modulation scheme according to an embodiment of the present invention, when it is determined that the terminal device UE uses a resource set with the location of the available time domain resource corresponding to the subframe 4, the subframe 5, and the subframe 6, it may be thus determined that the location of the available time domain resource overlaps the time domain resource set 2 in the target second mapping pattern, so that the modulation scheme 2 corresponding to the time domain resource set 2 may be determined as the modulation scheme corresponding to the available time domain resource.

It can be seen that when the time domain resource set actually used by the terminal device is a certain second time domain resource set, it is determined to use the modulation scheme corresponding to the second time domain resource set.

In a possible implementation, when the location of the available time domain resource corresponds to multiple time domain resource sets in the target second mapping pattern, any one or more of modulation schemes corresponding to the multiple time domain resource sets are used as the modulation scheme corresponding to the available time domain resource.

Figure 5:
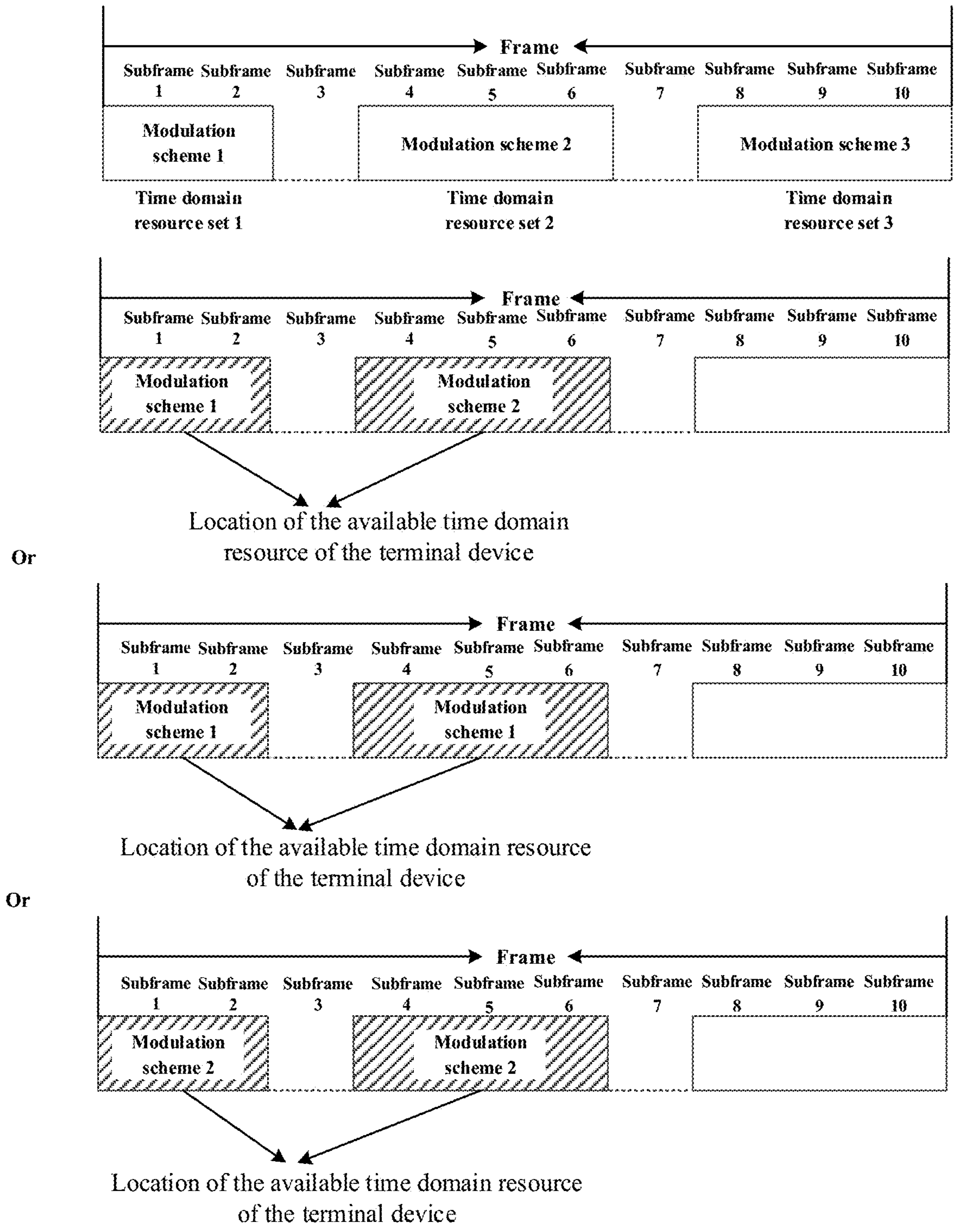
FIG. 5 is another schematic diagram of determining a modulation scheme according to an embodiment of the present application.

For example, referring to FIG. 5, which is a schematic diagram of determining a modulation scheme according to an embodiment of the present application, assuming that the location of the available time domain resource includes the subframe 1, the subframe 2, the subframe 4, the subframe 5, and the subframe 6, it may be determined that the location of the available time domain resource corresponds to the time domain resource set 1 and the time domain resource set 2 in the target second mapping pattern.

Specifically, as shown in FIG. 5, the modulation scheme 1 and the modulation scheme 2 may be selected as the modulation scheme corresponding to the available time domain resource. Alternatively, as shown in FIG. 5, the modulation scheme 1 may be selected as the modulation scheme corresponding to the available time domain resource. Alternatively, as shown in FIG. 5, the modulation scheme 2 may be selected as the modulation scheme corresponding to the available time domain resource.

It can be seen that there may be multiple time domain resource sets actually used by the terminal device, and a corresponding modulation scheme may be used for each second time domain resource set. Alternatively, the modulation scheme corresponding to a certain second time domain resource set is used for all time domain resource sets. For example, the certain time domain resource set may be the first one, the last one, or one in the middle of the multiple time domain resource sets.

In a possible implementation, when the location of the available time domain resource is a subset of any time domain resource set in the target second mapping pattern, the modulation scheme corresponding to the time domain resource set to which the available time domain resource belongs is used as the modulation scheme corresponding to the available time domain resource.

Figure 6:
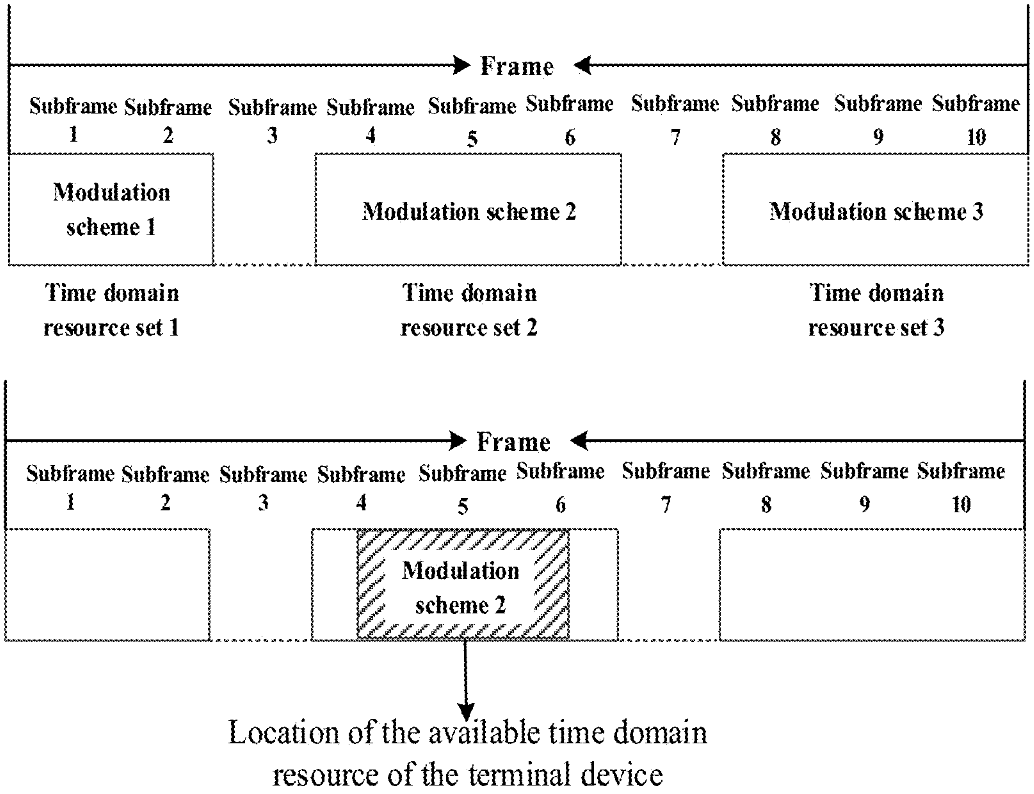
FIG. 6 is yet another schematic diagram of determining a modulation scheme according to an embodiment of the present application.

For example, referring to FIG. 6, which is a schematic diagram of determining a modulation scheme according to an embodiment of the present application, assuming that the location of the available time domain resource includes half of the subframe 4, the subframe 5, and half of the subframe 6, it may be determined that the location of the available time domain resource belongs to a subset of the time domain resource set 2, so that the modulation scheme 2 corresponding to the time domain resource set 2 may be used as the modulation scheme corresponding to the available time domain resource.

It can be seen that when the time domain resource set actually used by the terminal device is a part of a certain time domain resource set, the modulation scheme corresponding to the certain time domain resource set is used.

In a possible implementation, when the location of the available time domain resource intersects with any time domain resource set in the target second mapping pattern but does not intersect with other time domain resource sets other than the intersected time domain resource set, the modulation scheme corresponding to the intersected time domain resource set is used as the modulation scheme corresponding to the available time domain resource.

Figure 7:
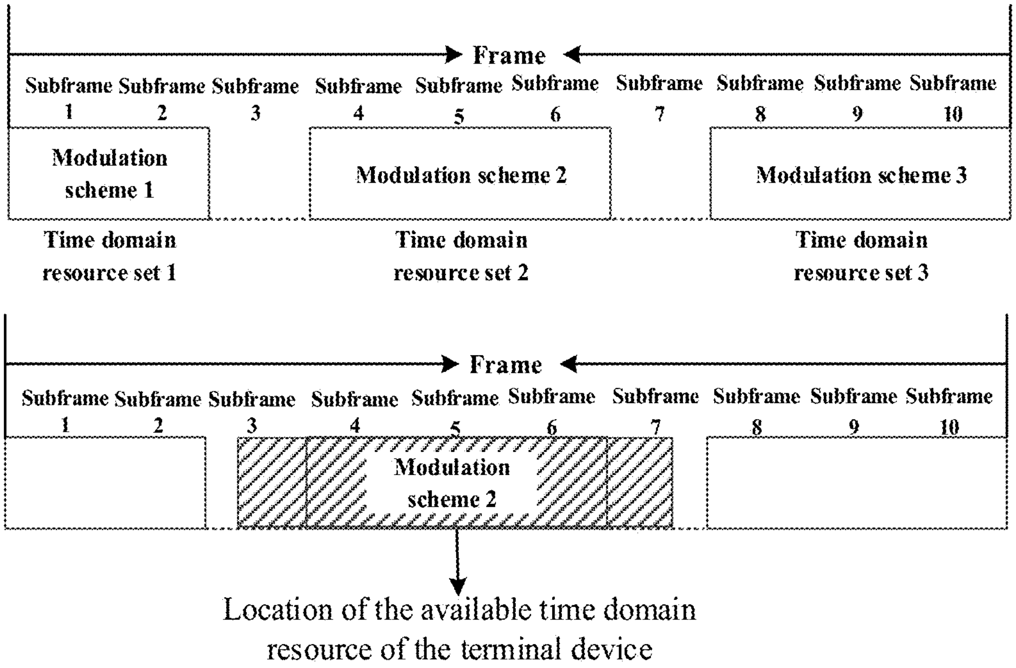
FIG. 7 is yet another schematic diagram of determining a modulation scheme according to an embodiment of the present application.

For example, referring to FIG. 7, which is a schematic diagram of determining a modulation scheme according to an embodiment of the present application, assuming that the location of the available resource location includes a part of the subframe 3, the subframe 4, the subframe 5, the subframe 6, and a part of the subframe 7, it may be determined that the location of the available time domain resource intersects with the time domain resource set 2 and does not intersect with any other time domain resource sets (e.g., the time domain resource set 1 and the time domain resource set 3 as shown in FIG. 7) other than the time domain resource set 2, so that the modulation scheme 2 corresponding to the time domain resource set 2 may be used as the modulation scheme corresponding to the available time domain resource.

It can be seen that the time domain resource set actually used by the terminal device may include a single time domain resource set without including all or part of other time domain resource sets, but is longer than that single time domain resource set. In this case, the modulation scheme corresponding to the included time domain resource set is used.

In a possible implementation, when the location of the available time domain resource includes multiple partial time domain resource sets in the target second mapping pattern, any one of the modulation schemes corresponding to the multiple time domain resource sets is used as the modulation scheme corresponding to the available time domain resource.

Figure 8:
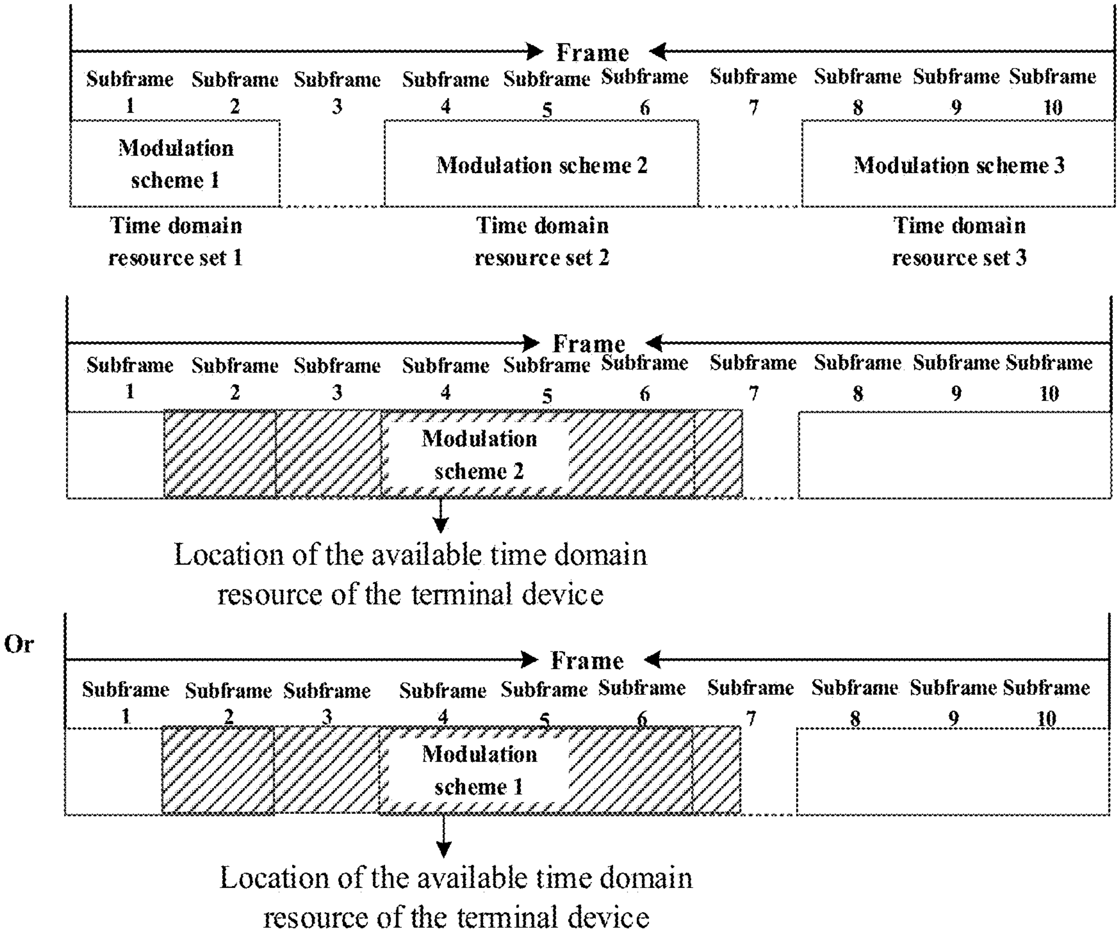
FIG. 8 is yet another schematic diagram of determining a modulation scheme according to an embodiment of the present application.

For example, referring to FIG. 8, which is a schematic diagram of determining a modulation scheme according to an embodiment of the present application, assuming that the available resource location includes the subframe 2, the subframe 3, the subframe 4, the subframe 5, the subframe 6, and half of the subframe 7, it may be determined that the location of the available time domain resource includes the time domain resource set 2 and a part of the time domain resource set 1. Optionally, referring to FIG. 8, the modulation scheme 2 corresponding to the time domain resource set 2 may be used as the modulation scheme corresponding to the available time domain resource. Alternatively, referring to FIG. 8, the modulation scheme 1 corresponding to the time domain resource set 1 may be used as the modulation scheme corresponding to the available time domain resource.

It can be seen that the time domain resource set actually used by the terminal device may include all or a part of the multiple time domain resource sets, and the modulation scheme corresponding to a certain second time domain resource set is used for all time domain resource sets. For example, the certain time domain resource set may be the first one, the last one, or a middle one of the multiple time domain resource sets.

In summary, the embodiments of the present application provide a solution for specifically determining the modulation scheme based on different divisions of the initial time domain resource set. In this way, the determination of the modulation scheme in various situations during the actual implementation process can be realized, enhancing the implementability of the solution provided in the embodiments of the present application and meeting various requirements of actual implementation.

In step 102, to-be-transmitted data of the terminal device is transmitted based on the modulation scheme.

In the embodiments of the present application, when there are limited available resources and a relatively large amount of data to be transmitted, if a channel condition is good, a higher-order modulation scheme may be selected, which can reduce the delay while ensuring data transmission performance (i.e., no segmentation or multiple transmissions are required). When there are sufficient available resources and a relatively small amount of data to be transmitted, a lower-order modulation scheme may be selected, which can effectively improve data transmission performance. When there are sufficient available resources and a large amount of data to be transmitted, a higher-order modulation scheme may be selected, which can reduce the delay while ensuring data transmission performance (i.e., no segmentation or multiple transmissions are required).

It can be seen that the terminal device can select different modulation schemes based on the length of the time domain resource and/or the location of the time domain resource, so that resources can be used more flexibly and the data transmission performance can be improved.

Figure 9:
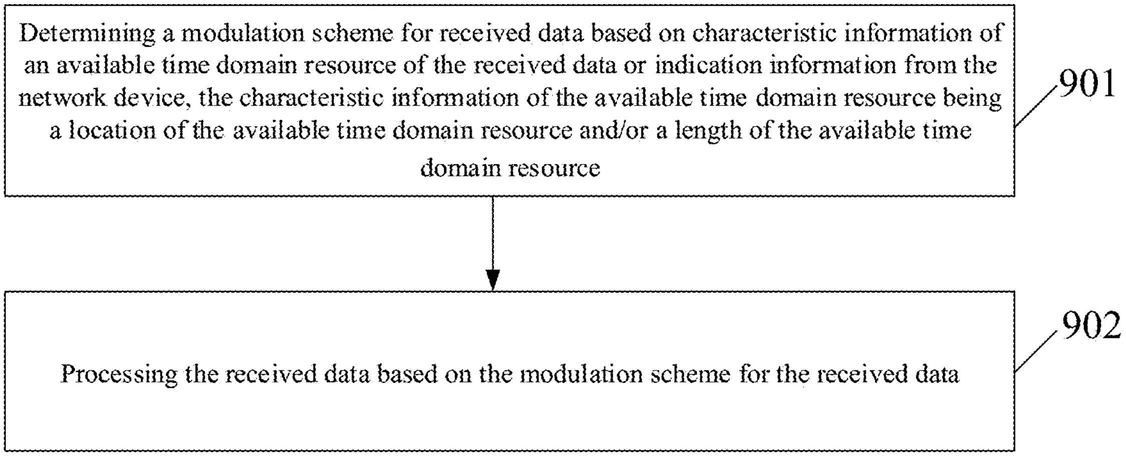
FIG. 9 is another schematic flowchart of a data transmission method according to an embodiment of the present application.

In the embodiments of the present application, FIG. 9 shows a data transmission method according to an embodiment of the present application. The method is applied to a network device, and a specific processing process is as follows.

In step 901, a modulation scheme for received data is determined based on characteristic information of an available time domain resource of the received data or indication information from the network device. The characteristic information of the available time domain resource includes a location of the available time domain resource and/or a length of the available time domain resource.

In step 902, the received data is processed based on the modulation scheme for the received data.

In some embodiments, determining the modulation scheme for the received data based on the characteristic information of the available time domain resource of the received data or indication information from the network device includes: determining a target first mapping pattern between time domain resource lengths and modulation schemes, and determining the modulation scheme for the received data based on the length of the available time domain resource or the indication information from the network device, in combination with the target first mapping pattern.

In the embodiments of the present application, the target first mapping pattern includes: a mapping relationship between groups of time domain resource lengths and modulation schemes, the groups of domain resource lengths being obtained by grouping the time domain resource lengths according to different thresholds; or a mapping relationship between each time domain resource length and a modulation scheme. In addition, different groups of time domain resource lengths correspond to different modulation schemes. Alternatively, some or all of the groups of time domain resource lengths correspond to the same modulation scheme.

It should be noted that a method for determining the first mapping pattern can be found in the foregoing embodiment corresponding to the method for determining the modulation scheme shown in FIG. 2, and will not be repeated herein.

In the embodiments of the present application, the network device may determine a target second mapping pattern between time domain resource sets and modulation schemes. The target second mapping pattern is determined from multiple second mapping patterns based on an identifier of a terminal device or the indication information from the network device. Then, the modulation scheme corresponding to the available time domain resource may be determined based on the target second mapping pattern and the location of the available time domain resource.

Specifically, a location relationship between different time domain resource sets includes any one of adjacent, spaced, or partially overlapping. It should be noted that a method for determining the second mapping pattern can be found in the embodiments corresponding to the method shown in FIG. 3, and will not be repeated herein.

In the embodiments of the present application, the network device can determine the modulation scheme for the received data according to the length or the location of the time domain resource of the received data, and further process the received data.

Obviously, the data transmission method provided in the embodiments of the present application can automatically select the appropriate modulation scheme for the available time domain resource determined based on the actual implementation situation on both the terminal side and the network device side, thereby realizing efficient utilization of resources and improving the data transmission performance.

Figure 10:
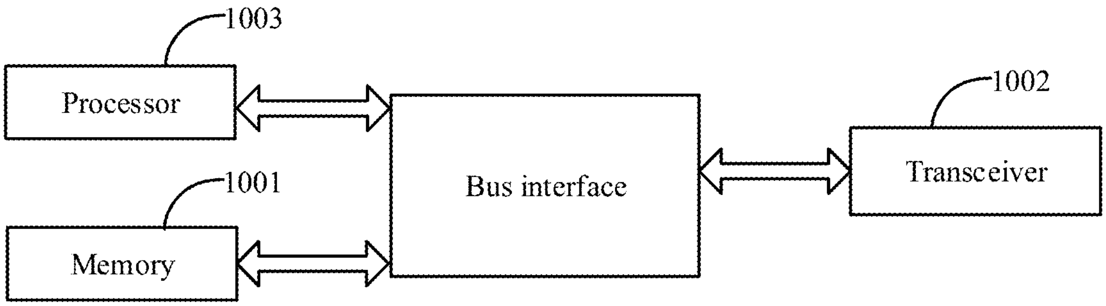
FIG. 10 is a schematic diagram of a physical architecture of a data transmission apparatus according to an embodiment of the present application.

Based on the same invention concept, referring to FIG. 10, the embodiments of the present application provide a data transmission apparatus, including a memory 1001, a transceiver 1002, and a processor 1003.

The memory 1001 is configured to store a computer program. The transceiver 1002 is configured to receive and transmit data under control of the processor. The processor 1003 is configured to read the computer program in the memory and perform the following operations:

- determining, based on characteristic information of an available time domain resource of a terminal device or indication information from a network device, a modulation scheme corresponding to the available time domain resource, the characteristic information of the available time domain resource including a location of the available time domain resource and/or a length of the available time domain resource; and
- transmitting to-be-transmitted data of the terminal device based on the modulation scheme.

In a possible implementation, when the characteristic information of the available time domain resource is the length of the available time domain resource, the processor 1003 performs the following operations:

- determining a target first mapping pattern between time domain resource lengths and modulation schemes; and
- determining the modulation scheme corresponding to the available time domain resource based on the length of the available time domain resource and the target first mapping pattern.

In a possible implementation, the target first mapping pattern includes: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

In a possible implementation, different groups of time domain resource lengths correspond to different modulation schemes. Alternatively, some or all of the groups of time domain resource lengths correspond to the same modulation scheme.

In a possible implementation, the processor 1003 performs the following operations:

- determining the target first mapping pattern from multiple first mapping patterns based on an identifier of the terminal device or the indication information from the network device.

In a possible implementation, when the characteristic information of the available time domain resource is the location of the available time domain resource, the processor 1003 performs the following operations:

- determining a target second mapping pattern between time domain resource sets and modulation schemes, the target second mapping pattern being determined from multiple second mapping patterns based on the identifier of the terminal device or the indication information from the network device; and
- determining the modulation scheme corresponding to the available time domain resource based on the target second mapping pattern and the location of the available time domain resource.

In a possible implementation, a location relationship between different time domain resource sets includes any one of adjacent, spaced, or partially overlapping.

In a possible implementation, the time domain resource set is any one of multiple time domain resource sets obtained by dividing an initial time domain resource set based on location.

In a possible implementation, the processor 1003 performs the following operations:

- when the location of the available time domain resource overlaps any time domain resource set in the target second mapping pattern, determining the modulation scheme corresponding to the time domain resource set overlapping the available time domain resource as the modulation scheme corresponding to the available time domain resource; or
- when the location of the available time domain resource corresponds to multiple time domain resource sets in the target second mapping pattern, using any one or more of modulation schemes corresponding to the multiple time domain resource sets as the modulation scheme corresponding to the available time domain resource; or
- when the location of the available time domain resource is a subset of any time domain resource set in the target second mapping pattern, using the modulation scheme corresponding to the time domain resource set to which the available time domain resource belongs as the modulation scheme corresponding to the available time domain resource; or when the location of the available time domain resource intersects with any time domain resource set in the target second mapping pattern but does not intersect with other time domain resource sets other than the intersected time domain resource set, using the modulation scheme corresponding to the intersected time domain resource set as the modulation scheme corresponding to the available time domain resource; or
- when the location of the available time domain resource includes multiple partial time domain resource sets in the target second mapping pattern, using any one of the modulation schemes corresponding to the multiple time domain resource sets as the modulation scheme corresponding to the available time domain resource.

Figure 11:
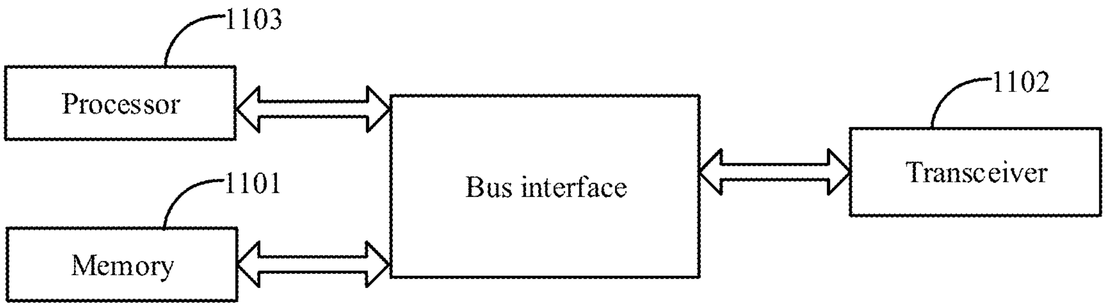
FIG. 11 is a schematic diagram of a physical architecture of a data transmission apparatus according to an embodiment of the present application.

Based on the same invention concept, referring to FIG. 11, the embodiments of the present application provide a data transmission apparatus, including a memory 1101, a transceiver 1102, and a processor 1103.

The memory 1101 is configured to store a computer program. The transceiver 1102 is configured to receive and transmit data under control of the processor. The processor 1103 is configured to read the computer program in the memory and perform the following operations:

- determining a modulation scheme for received data based on characteristic information of an available time domain resource of the received data or indication information from a network device, the characteristic information of the available time domain resource including a location of the available time domain resource and/or a length of the available time domain resource; and
- processing the received data based on the modulation scheme for the received data.

In a possible implementation, the processor 1103 performs the following operations:

- determining a target first mapping pattern between time domain resource lengths and modulation schemes; and
- determining the modulation scheme for the received data based on the length of the available time domain resource or the indication information from the network device, in combination with the target first mapping pattern.

In a possible implementation, the target first mapping pattern includes: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

In a possible implementation, different groups of time domain resource lengths correspond to different modulation schemes. Alternatively, some or all of the groups of time domain resource lengths correspond to the same modulation scheme.

In a possible implementation, the processor 1103 performs the following operations:

- determining a target second mapping pattern between time domain resource sets and modulation schemes, the target second mapping pattern being determined from multiple second mapping patterns based on an identifier of the terminal device or the indication information from the network device; and
- determining the modulation scheme corresponding to the available time domain resource based on the target second mapping pattern and the location of the available time domain resource.

In a possible implementation, a location relationship between different time domain resource sets includes any one of adjacent, spaced, or partially overlapping.

In a possible implementation, the time domain resource set is any one of multiple time domain resource sets obtained by dividing an initial time domain resource set based on location.

Figure 12:
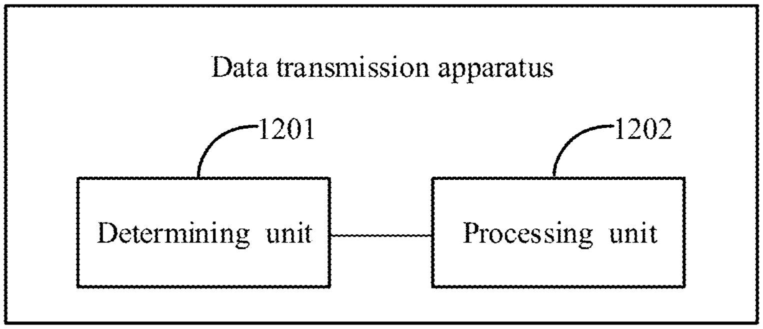
FIG. 12 is a schematic diagram of a logical architecture of a data transmission apparatus according to an embodiment of the present application.

Based on the same invention concept, referring to FIG. 12, the embodiments of the present application provide a data transmission apparatus, including:

- a determining unit 1201 configured to determine, based on characteristic information of an available time domain resource of a terminal device or indication information from a network device, a modulation scheme corresponding to the available time domain resource, the characteristic information of the available time domain resource including a location of the available time domain resource and/or a length of the available time domain resource; and
- a processing unit 1202 configured to transmit to-be-transmitted data of the terminal device based on the modulation scheme.

In a possible implementation, when the characteristic information of the available time domain resource is the length of the available time domain resource, the determining unit 1201 is specifically configured to:

- determine a target first mapping pattern between time domain resource lengths and modulation schemes; and
- determine the modulation scheme corresponding to the available time domain resource based on the length of the available time domain resource and the target first mapping pattern.

In a possible implementation, the target first mapping pattern includes: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

In a possible implementation, different groups of time domain resource lengths correspond to different modulation schemes. Alternatively, some or all of the groups of time domain resource lengths correspond to the same modulation scheme.

In a possible implementation, the determining unit 1201 is specifically configured to determine the target first mapping pattern from multiple first mapping patterns based on an identifier of the terminal device or the indication information from the network device.

In a possible implementation, when the characteristic information of the available time domain resource is the location of the available time domain resource, the determining unit 1201 is specifically configured to:

- determine a target second mapping pattern between time domain resource sets and modulation schemes, the target second mapping pattern being determined from multiple second mapping patterns based on the identifier of the terminal device or the indication information from the network device; and
- determine the modulation scheme corresponding to the available time domain resource based on the target second mapping pattern and the location of the available time domain resource.

In a possible implementation, a location relationship between different time domain resource sets includes any one of adjacent, spaced, or partially overlapping.

In a possible implementation, the time domain resource set is any one of multiple time domain resource sets obtained by dividing an initial time domain resource set based on location.

In a possible implementation, the determining unit 1201 is specifically configured to:

- when the location of the available time domain resource overlaps any time domain resource set in the target second mapping pattern, determine the modulation scheme corresponding to the time domain resource set overlapping the available time domain resource as the modulation scheme corresponding to the available time domain resource; or
- when the location of the available time domain resource corresponds to multiple time domain resource sets in the target second mapping pattern, use any one or more of modulation schemes corresponding to the multiple time domain resource sets as the modulation scheme corresponding to the available time domain resource; or when the location of the available time domain resource is a subset of any time domain resource set in the target second mapping pattern, using the modulation scheme corresponding to the time domain resource set to which the available time domain resource belongs as the modulation scheme corresponding to the available time domain resource; or when the location of the available time domain resource intersects with any time domain resource set in the target second mapping pattern but does not intersect with other time domain resource sets other than the intersected time domain resource set, using the modulation scheme corresponding to the intersected time domain resource set as the modulation scheme corresponding to the available time domain resource; or when the location of the available time domain resource includes multiple partial time domain resource sets in the target second mapping pattern, use any one of modulation schemes corresponding to the multiple time domain resource sets as the modulation scheme corresponding to the available time domain resource.

Figure 13:
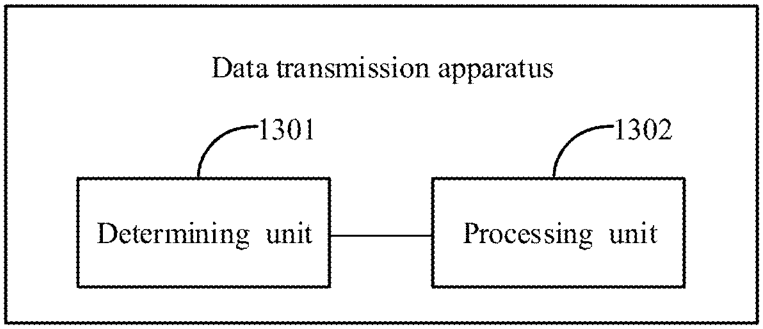
FIG. 13 is a schematic diagram of a logical architecture of a data transmission apparatus according to an embodiment of the present application.

Based on the same invention concept, referring to FIG. 13, the embodiments of the present application provide a data transmission apparatus, including:

a determining unit 1301 configured to determine a modulation scheme for received data based on characteristic information of an available time domain resource of the received data or indication information from a network device, the characteristic information of the available time domain resource including a location of the available time domain resource and/or a length of the available time domain resource; and a processing unit 1302 configured to process the received data based on the modulation scheme for received data.

In a possible implementation, the determining unit 1301 is specifically configured to:

determine a target first mapping pattern between time domain resource lengths and modulation schemes; and determine the modulation scheme for the received data based on the length of the available time domain resource or the indication information from the network device, in combination with the target first mapping pattern.

In a possible implementation, the target first mapping pattern includes: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

In a possible implementation, different groups of time domain resource lengths correspond to different modulation schemes. Alternatively, some or all of the groups of time domain resource lengths correspond to the same modulation scheme.

In a possible implementation, the determining unit 1301 is specifically configured to:

determine a target second mapping pattern between time domain resource sets and modulation schemes, the target second mapping pattern being determined from multiple second mapping patterns based on an identifier of the terminal device or the indication information from the network device; and determine the modulation scheme corresponding to the available time domain resource based on the target second mapping pattern and the location of the available time domain resource.

In a possible implementation, a location relationship between different time domain resource sets includes any one of adjacent, spaced, or partially overlapping.

In a possible implementation, the time domain resource set is any one of multiple time domain resource sets obtained by dividing an initial time domain resource set based on location.

Based on the same invention concept, an embodiment of the present application provides a non-transitory processor-readable storage medium, which has a computer program stored therein. The computer program is configured to cause the processor to perform the solutions as described in the data transmission method.

Based on the same invention concept, an embodiment of the present application provides a non-transitory processor-readable storage medium, which has a computer program stored therein. The computer program is configured to cause the processor to perform the solutions as described in the data transmission method.

It should be understood by those skilled in the art that the embodiments of the present application may be provided as a method, a system, or a computer program product. Therefore, a form of an embodiment in which hardware is completely adopted, an embodiment in which software is completely adopted or an embodiment in which software is combined with hardware may be adopted in the present application. Moreover, a computer program product form implemented on one or more readable storage mediums (which include, but are not limited to, a magnetic disk memory, a CD-ROM, an optical memory, and the like) including computer available program codes may be adopted in the present application.

The present application is described with reference to the flowcharts and/or the block diagrams of the methods, the apparatus (system), and the computer program products according to the embodiments of the present application. It should be understood that each flow and/or block in the flowcharts and/or block diagrams, and a combination of processes flows and/or blocks in the flowcharts and/or block diagrams may be implemented by computer program instructions. These computer program instructions may be provided to a processor of a general-purpose computer, a dedicated computer, an embedded processor, or other programmable data processing device to produce a machine, such that an apparatus for implementing the functions specified in one or more flows in the flowcharts and/or one or more blocks in the block diagrams is produced by the instructions executed by the processor of the computer or other programmable data processing devices.

The computer program instructions may also be stored in a computer-readable memory that can instruct a computer or other programmable data processing devices to work in a specific way, so that a manufactured product including an instruction device is generated by the instructions stored in the computer-readable memory, and the instruction device achieves the specified functions in one or more flows in the flowcharts and/or one or more blocks in the block diagrams.

These computer program instructions may also be loaded onto a computer or other programmable data processing devices such that a series of operation steps are performed on the computer or other programmable devices to produce computer-implemented processing, so that the instructions executed on the computer or other programmable data processing devices provide the steps for implementing the specified functions in one or more flows in the flowcharts and/or one or more blocks in the block diagrams.

Apparently, those skilled in the art may make various modifications and variations to the present application without departing from the spirit and scope of the present application. Thus, the present application is also intended to encompass these modifications and variations therein provided that these modifications and variations to the present application fall within the scope of the claims of the present application and the equivalent technologies thereof.

What is claimed is:

1. A data transmission method, applied to a terminal device, wherein the method comprises:

determining, based on characteristic information of an available time domain resource of the terminal device, a modulation scheme corresponding to the available time domain resource, the characteristic information of the available time domain resource comprising a location of the available time domain resource and/or a length of the available time domain resource; and transmitting to-be-transmitted data of the terminal device based on the modulation scheme.

2. The method according to claim 1, wherein when the characteristic information of the available time domain resource is the length of the available time domain resource, determining, based on the characteristic information of the available time domain resource, the modulation scheme corresponding to the available time domain resource comprises:

determining a target first mapping pattern between time domain resource lengths and modulation schemes; and determining the modulation scheme corresponding to the available time domain resource based on the length of the available time domain resource and the target first mapping pattern.

3. The method according to claim 2, wherein the target first mapping pattern comprises: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

4. The method according to claim 3, wherein different groups of time domain resource lengths correspond to different modulation schemes, or some or all of the groups of time domain resource lengths correspond to a same modulation scheme.

5. The method according to claim 2, wherein determining the target first mapping pattern between time domain resource lengths and modulation schemes comprises:

determining the target first mapping pattern from multiple first mapping patterns based on an identifier of the terminal device or the indication information from the network device.

6. The method according to claim 1, wherein when the characteristic information of the available time domain resource is the location of the available time domain resource, determining, based on the characteristic information of the available time domain resource, the modulation scheme corresponding to the available time domain resource comprises:

determining a target second mapping pattern between time domain resource sets and modulation schemes, the target second mapping pattern being determined from multiple second mapping patterns based on an identifier of the terminal device or the indication information from the network device; and determining the modulation scheme corresponding to the available time domain resource based on the target second mapping pattern and the location of the available time domain resource.

7. The method according to claim 6, wherein a location relationship between different time domain resource sets comprises any one of adjacent, spaced, or partially overlapping.

8. The method according to claim 6, wherein the time domain resource set is any one of multiple time domain resource sets obtained by dividing an initial time domain resource set based on location.

9. The method according to claim 8, wherein determining the modulation scheme corresponding to the available time domain resource based on the target second mapping pattern and the location of the available time domain resource comprises:

when the location of the available time domain resource overlaps any time domain resource set in the target second mapping pattern, determining the modulation scheme corresponding to the time domain resource set overlapping the available time domain resource as the modulation scheme corresponding to the available time domain resource; or when the location of the available time domain resource corresponds to multiple time domain resource sets in the target second mapping pattern, using any one or more of modulation schemes corresponding to the multiple time domain resource sets as the modulation scheme corresponding to the available time domain resource; or when the location of the available time domain resource is a subset of any time domain resource set in the target second mapping pattern, using the modulation scheme corresponding to the time domain resource set to which the available time domain resource belongs as the modulation scheme corresponding to the available time domain resource; or when the location of the available time domain resource intersects with any time domain resource set in the target second mapping pattern but does not intersect with other time domain resource sets other than the intersected time domain resource set, using the modulation scheme corresponding to the intersected time domain resource set as the modulation scheme corresponding to the available time domain resource; or when the location of the available time domain resource comprises multiple partial time domain resource sets in the target second mapping pattern, using any one of modulation schemes corresponding to the multiple time domain resource sets as the modulation scheme corresponding to the available time domain resource.

10. A non-transitory processor-readable storage medium, wherein the processor-readable storage medium stores a computer program, which is configured to cause the processor to perform the method according to claim 1.

11. A data transmission method, applied to a network device, wherein the method comprises:

determining a modulation scheme for received data based on characteristic information of an available time domain resource of the received data, the characteristic information of the available time domain resource comprising a location of the available time domain resource and/or a length of the available time domain resource; and processing the received data based on the modulation scheme for the received data.

12. The method according to claim 11, wherein determining the modulation scheme for the received data based on the characteristic information of the available time domain resource of the received data or the indication information from the network device comprises:

determining a target first mapping pattern between time domain resource lengths and modulation schemes; and determining the modulation scheme for the received data based on the length of the available time domain resource or the indication information from the network device, in combination with the target first mapping pattern.

13. The method according to claim 12, wherein the target first mapping pattern comprises: a mapping relationship between groups of time domain resource lengths and modulation schemes, the groups of time domain resource lengths being obtained by grouping the time domain resource lengths according to different thresholds; or a mapping relationship between each time domain resource length and a modulation scheme.

14. The method according to claim 13, wherein different groups of time domain resource lengths correspond to different modulation schemes, or some or all of the groups of time domain resource lengths correspond to the same modulation scheme.

15. The method according to claim 11, wherein determining the modulation scheme for the received data based on the characteristic information of the available time domain resource of the received data or the indication information from the network device comprises:

determining a target second mapping pattern between time domain resource sets and modulation schemes, the target second mapping pattern being determined from multiple second mapping patterns based on an identifier of a terminal device or the indication information from the network device; and determining the modulation scheme corresponding to the available time domain resource based on the target second mapping pattern and the location of the available time domain resource.

16. The method according to claim 15, wherein a location relationship between different time domain resource sets comprises any one of adjacent, spaced, or partially overlapping.

17. The method according to claim 15, wherein the time domain resource set is any one of multiple different time domain resource sets obtained by dividing an initial time domain resource set based on location.

18. A data transmission apparatus, comprising a memory, a transceiver, and a processor, wherein the memory is configured to store a computer program, the transceiver is configured to receive and transmit data under control of the processor, and the processor is configured to read the computer program in the memory and perform the method according to claim 11.

19. A non-transitory processor-readable storage medium, wherein the processor-readable storage medium stores a computer program, which is configured to cause the processor to perform the method according to claim 11.

20. A data transmission apparatus, comprising a memory, a transceiver, and a processor, wherein the memory is configured to store a computer program, the transceiver is configured to receive and transmit data under control of the processor, and the processor is configured to read the computer program in the memory and perform the following operations:

determining, based on characteristic information of an available time domain resource of a terminal device, a modulation scheme corresponding to the available time domain resource, the characteristic information of the available time domain resource comprising a location of the available time domain resource and/or a length of the available time domain resource; and transmitting to-be-transmitted data of the terminal device based on the modulation scheme.

* * * * *